Oct. 20, 1970

W. R. POWELL 3,535,537

OPTICAL LINE SPLITTER HAVING LIGHT CONDUCTING STRIPS
WITH FUSED INPUT END AND FLARED OUTPUT ENDS

Filed April 9, 1968

WILLIAM R. POWELL
INVENTOR

BY *J. O. Tresansky*
ATTORNEY

United States Patent Office 3,535,537
Patented Oct. 20, 1970

3,535,537
OPTICAL LINE SPLITTER HAVING LIGHT CONDUCTING STRIPS WITH FUSED INPUT END AND FLARED OUTPUT ENDS
William R. Powell, Laurel, Md., assignor, by mesne assignments, to the United States of America as represented by the Secretary of the Navy
Filed Apr. 9, 1968, Ser. No. 719,875
Int. Cl. G02b 5/16; G01j 3/12
U.S. Cl. 250—227
4 Claims

ABSTRACT OF THE DISCLOSURE

The subject invention relates to apparatus for analyzing the output trace of a monochromator. More particularly, the monochromator output is impressed upon a series of adjacently positioned strips of light-conducting elements and is thereby split into components equal in number to the number of light conducting strips. The output ends of the light-conductors are fanned, or flared, and therefore each component of the monochromator output trace can be readily analyzed by feeding the separate outputs of said light conducting elements into individual photomultiplier tubes.

BACKGROUND OF THE INVENTION

(A) Field of the invention

The subject invention relates generally to the field of light transmitting fibers. More particularly, the subject apparatus is an array of thin elongated strips of light conducting material capable of dissecting an image, segregating its component parts, and feeding said component parts to amplification and analyzation means.

(B) Description of the prior art

In plasma research it is often necessary to spectroscopically analyze light rays emitted from a plasma discharge; but it is sometimes desirable to confine this analysis, not to the entire spectrum, but to only a narrow band of frequencies or to a single spectral line. When this is the case, an instrument called a monochromator is employed—the monochromator output being a narrow band-width visual display of a small portion of the plasma-created light spectrum.

Before proceeding further, it should be remembered that each line appearing on a spectroscope or on a monochromator display screen is not composed of a finite band of frequencies; but in theory, each spectral line encompasses frequencies ranging from zero to infinity—the plot of frequency versus intensity being shaped much like the Gaussian, or normal, distribution curve. A typical spectral line as it would appear on a monochromator output screen is illustrated in FIG. 4. Therefore, so that uniformity exists between researchers, the standard for line width measurements is defined as twice the distance (measured in frequency) between the point of maximum intensity and point of ½-intensity, or put another way, the distance from ½-intensity to ½-intensity. By so defining line width, it becomes necessary to accurately determine the frequency at which maximum intensity occurs and also the frequencies at which the two ½-intensity points occur.

A method for determining line width which is extensively used in the prior art is as follows. The monochromator output is restricted to a very narrow bandwidth encompassing only a small portion of the expected line width. A series of plasma discharges are then initiated and are studied until the maximum intensity and the frequency thereof are determined (this being done by incrementally changing the display frequency between successive discharges). Then a series of plasma discharges are initiated and are studied until the ½-intensity points are determined (in a manner similar to that employed in determining the point of maximum intensity). While this research technique accomplishes the desired result—determining the line width—there are drawbacks which cannot be ignored. The technique for analyzing successive plasma discharges is time consuming and introduces error factors since no two plasma discharges are exactly alike.

Ideally, the researcher desires to initiate a single plasma discharge, display the line of interest on a monochromator and concurrently determine the line width. With present-day techniques this is not feasible since the monochromator display is of a size too small to adequately study the line width. The present invention makes possible the above-outlined ideal approach.

SUMMARY OF THE INVENTION

The subject invention relates to apparatus for extracting and optically transporting a visual image from the output of a monochromator to a series of electro-optical devices for analyzing the visual image. More particularly, a series of thin elongated strips of light conducting material are stacked and are fused together at one end. The fused end is made planar and is made to abut the output display, or is placed in the focal plane of an imaging lens, of a monochromator. In this manner, the output display is divided into a plurality of strips, equal in number to the number of light conducting elements. The light conductors are formed in such a manner that their ends remote from the fused end fan out, or flare. By so shaping the light conducting elements, it becomes obvious that each portion of the once-whole monochromator image can be separately and conveniently studied. Therefore, associated with the light conducting elements, and positioned at their ends remote from their fused ends, is a plurality of photomultiplier tubes the outputs of which are fed to recording devices.

In operation, a single plasma discharge is initiated and a single spectral line is displayed on a monochromator. Since the horizontal axis of the monochromator output display is in units of frequency, it is readily apparent that by knowing the position of a vertical strip of said output display, its frequency band is also known. Therefore, when the fused ends of the subject light conducting elements are caused to abut the monochromator output, or lie in the focal plane of an imaging lens, said output is divided among the individual elements into discrete bands of frequency. When, then, the light transmitted by each light conducting element is amplified by a photomultiplier tube, the output of each tube is proportional to the intensity of light falling within a known frequency range. From this, it is obvious that the maximum intensity and the ½-intensity points, and the frequencies at which they occur, are simply determined by merely observing the outputs from the photomultiplier tubes.

The subject invention, as described above, provides for an accurate width analysis of a given spectral line emanated by a plasma discharge without the necessity for repeating the discharge and without being hindered by the before-problematic size limitation of the monochromator output image. It should be noted, however, that the subject invention is not so limited. Other of the possible uses will become readily apparent to those skilled in the art when reference is made to the following description, taken in conjunction with the accompanying drawings.

BRIEF DESCRIPTION OF THE DRAWINGS

FIG. 2 is a plan view of the optical device of FIG. 1;

DESCRIPTION OF THE PREFERRED EMBODIMENTS

Figure 1:
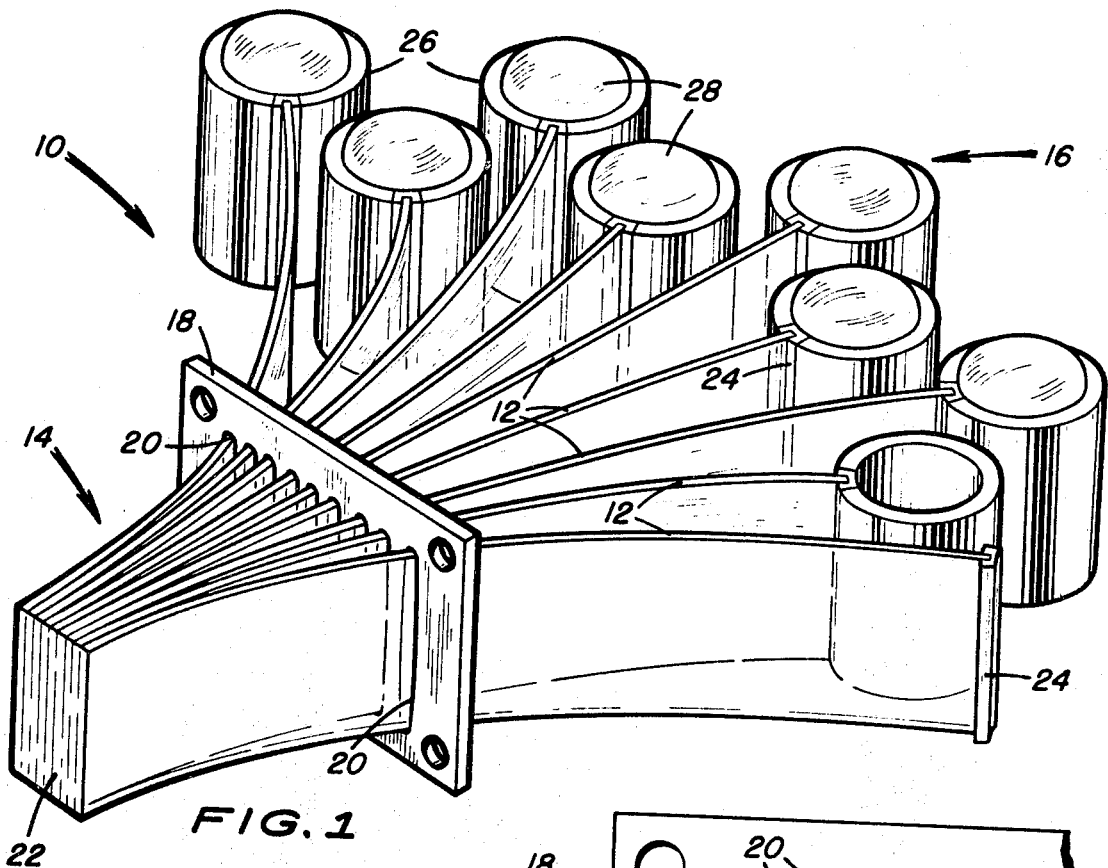
FIG. 1 is a perspective view of the optical device of the subject invention with some of the components removed for clarity.

Referring concurrently to FIGS. 1 and 2, the optical portion of the subject invention is shown generally at 10 and comprises a plurality of light conducting elements 12 having input ends shown generally at 14 and output ends shown generally at 16, and a separator plate 18 having therein a plurality of slots 20. The input extremities of all of said light conducting elements are arranged in such a manner that they form an input plane 22. This plane 22 is maintained by fusing together all of the elements 12 at their extreme input end portions.

As noted above, and as shown in FIGS. 1 and 2, the output ends of the light transmitting elements 12 are fanned, or flared; and as explained below, the flare permits light transmitted through each element 12 to be amplified and analyzed separately from light transmitted through all of the other elements 12. The slotted separator plate 18, located intermediate the input ends 14 and the output ends 16 of the light transmitting elements 12, and positioned transverse to the length of said light transmitting elements, serves to maintain the flared configuration shown.

Also serving to maintain the elements 12 in the illustrated fanned position is the combined action of a plurality of small blocks of light conducting material, shown at 24, clamps 26, and photomultiplier tubes 28. More particularly, each element 12 is connected at its extreme output end to one of the blocks 24; each of the blocks 24 is supported between the clamping faces of one of the clamps 26; and each of the clamps 26 surrounds one of the photomultiplier tubes 28. Each tube 28 is fixedly attached to a base (not shown) to which the plate 18 is also attached; and therefore, the light conducting elements 12 are maintained in fan shape by forces acting at the input plane 22, at the plate 18 and at the photomultiplier tubes 28.

Figure 3:
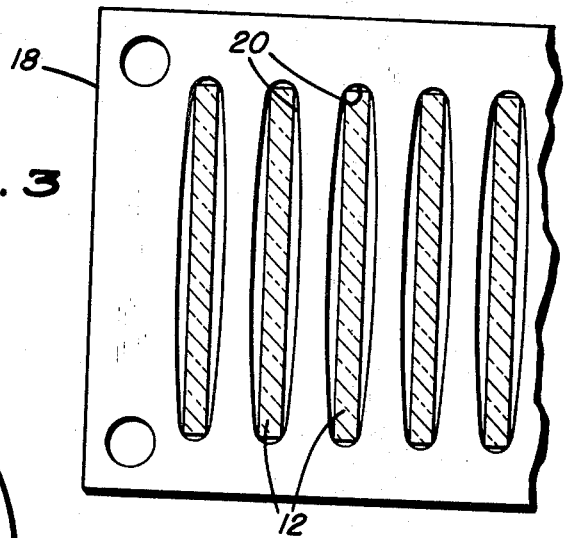
FIG. 3 is a cross-section of the device taken along line 3—3 of FIG. 2.
Figure 4:
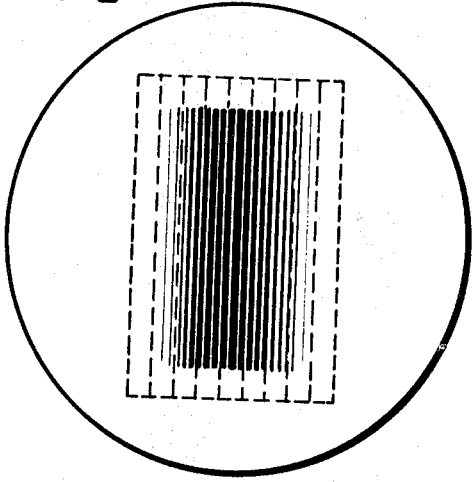
FIG. 4 is an illustration of a typical output display from a monochromator.

To insure that the ideal total internal reflection exhibited by the light transmitting elements 12 is not destroyed, two precautions must be taken. The first is the provision of the light conducting blocks 24. By using these blocks, the elements 12 can be securely affixed to the tubes 28 without the clamps 26 coming in direct contact with said elements. The second precaution also relates to the avoidance of physical contact with the light conducting elements 12 and is best seen in FIG. 3. There it is shown that the slots 20 in the separator plate 18 are shaped in such a manner that only minimum contact between the plate 18 and the elements 12 results. In this way, any variance from the ideal total internal reflection is kept at a minimum.

Referring now to FIGS. 1–4, the operation of the subject invention will be explained. The input plane 22 of the subject invention is made to abut the output screen, or is placed in the focal plane of an imaging lens, of a monochromator (the screen or focal plane being shown in FIG. 4). The FIG. 4 image is then divided into thin strips equal in number to the number of elements 12. (Representative strips are shown in dotted lines in FIG. 4.) These image strips are transmitted from the input end 14 to the output end 16 of the light conductor elements 12 and are finally caused to impinge upon the photomultiplier tubes 28. The tubes 28 convert this impinging light into electrical signals and feed these signals to appropriate recording devices (not shown). Since each element 12 transports light associated with a known band of frequencies (the horizontal axis of the FIG. 4 display being in terms of frequency), a perusal of the recording devices yields information regarding both the intensity levels and the frequencies at which these intensity levels occur. From this information the spectral line width is easily ascertained.

In summary, there has been disclosed apparatus which allows a researcher to conveniently ascertain the width of a spectral line appearing on the face of a spectroscope or a monochromator. It should be remembered, however, that the instant invention is not so limited. Various alterations and modifications may become apparent to those skilled in the art and it is intended that such modifications and alterations be considered within the purview of the present invention except as limited by the hereinafter appended claims.

What is claimed is:

1. A device for optically segmenting and transporting an image, comprising a plurality of light transmitting elements in the form of elongated strips of light conducting material wherein each strip has an input end and an output end, the input ends of said elements being fused together to form an input plane and the output ends of said elements being flared, whereby the output end of each element will be separated from the output ends of its neighboring elements;

means for maintaining the output ends of said light transmitting elements in positions to form a flared end;

a plurality of light conducting blocks, one of said light conducting blocks being joined to the output end of each of said light transmitting elements, for avoiding interference with the total internal reflection ideally exhibited by said light transmitting elements;

a plurality of light analyzing means, one of said light analyzing means being positioned adjacent the output end of each of said light transmitting elements and contacting the light conducting block joined thereto; and a plurality of clamps, equal in number to the number of light transmitting elements, each clamp being connected with one of said light conducting blocks and being further connected with one of said light analyzing means, whereby each of said clamps serves to maintain one light conducting block in contact with one of said light analyzing means.

2. The apparatus of claim 1 wherein said means for maintaining said flared end comprises a slotted separator plate located intermediate the input ends and the output ends of said light transmitting elements and positioned transverse to the length of said light transmitting elements, each light transmitting element passing through a single slot in said plate and being restrained thereby.

3. The apparatus of claim 2 wherein the slots in said separator plate are shaped in such a manner that each light transmitting element contacts its associated slot over only a small portion of its surface.

4. The apparatus of claim 1 wherein each of said plurality of light analyzing means is a photomultiplier tube.

References Cited

UNITED STATES PATENTS

| 3,428,817 | 2/1969 | Hofmeister et al. | 250—227 X |
| 3,177,470 | 4/1965 | Galopin | 250—227 X |
| 3,328,589 | 6/1967 | Ferguson | 250—227 X |
| 3,290,505 | 12/1966 | Stavis | 250—227 X |
| 3,411,011 | 11/1968 | Genahr et al. | 250—227 |

FOREIGN PATENTS

| 149,599 | 1962 | U.S.S.R. |
| 29,800 | 1964 | Germany. |
| 470,638 | 8/1937 | Great Britain. |

OTHER REFERENCES

Agnew et al., "A Ten Channel Infrared Spectrograph," Journal of the Optical Society of America, February 1951, pp. 76–79, 356–98.

ROBERT SEGAL, Primary Examiner

U.S. Cl. X.R.

350—96; 356—99